April 18, 1967   G. PERRELLA ETAL   3,314,556
CONVEYING SYSTEM

Filed April 14, 1965   10 Sheets-Sheet 1

INVENTORS
GUIDO PERRELLA
FRANCOIS M. PICKER
By
Cushman, Darby & Cushman
ATTORNEYS April 18, 1967  G. PERRELLA ET AL  3,314,556
CONVEYING SYSTEM Filed April 14, 1965  10 Sheets-Sheet 3

INVENTORS
GUIDO PERRELLA
FRANCOIS M. PICKER
By
Cushman Darby & Cushman
ATTORNEYS

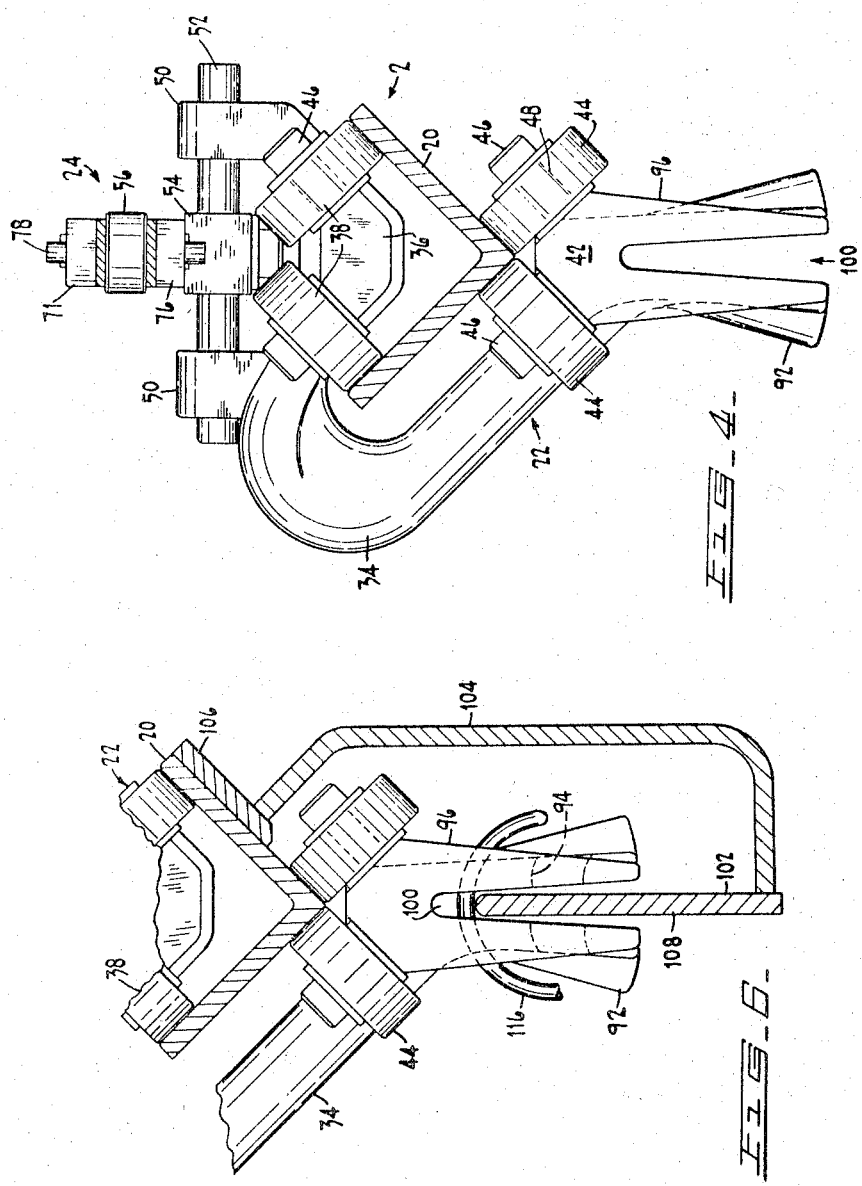

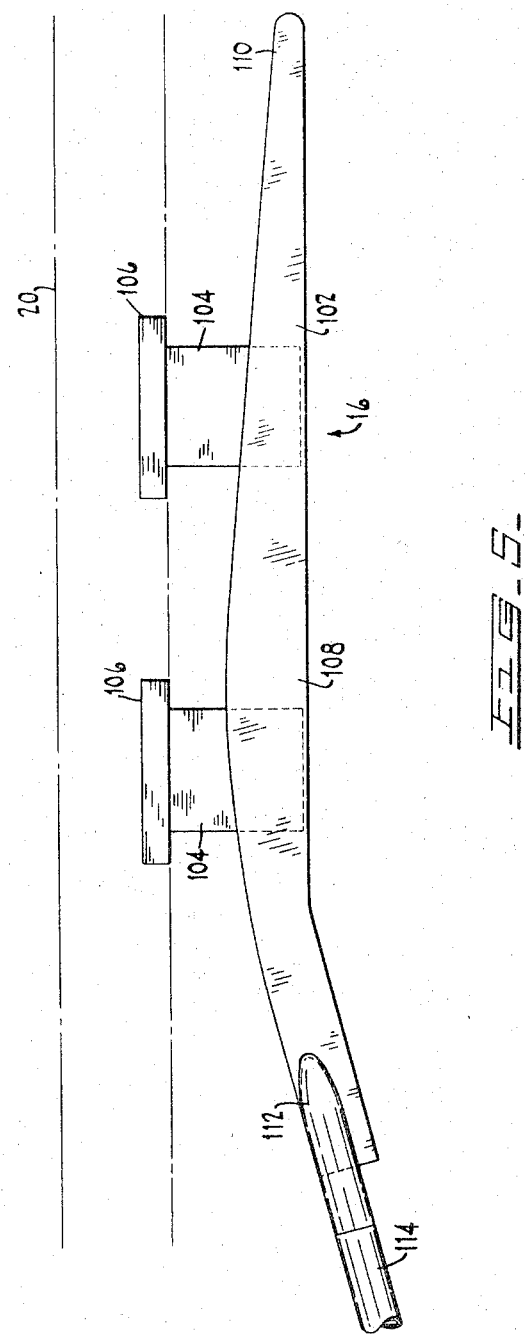

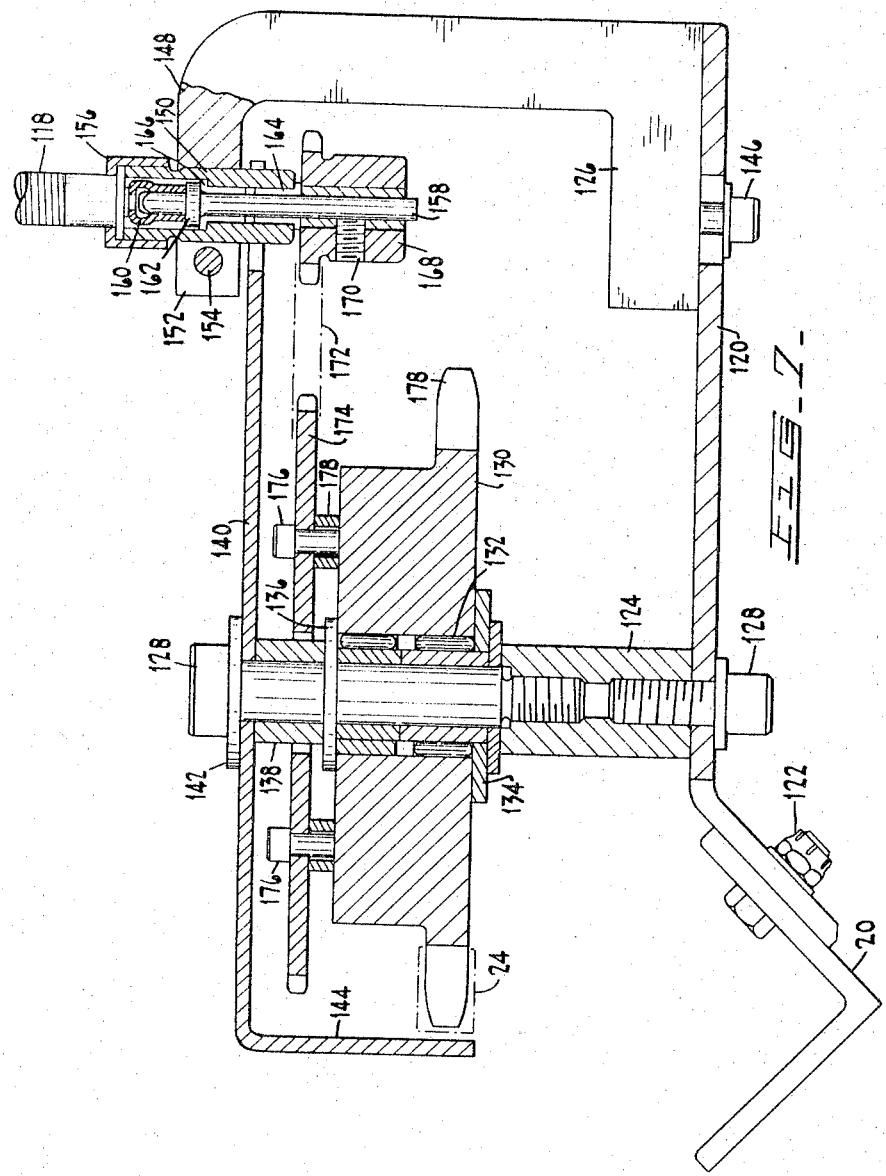

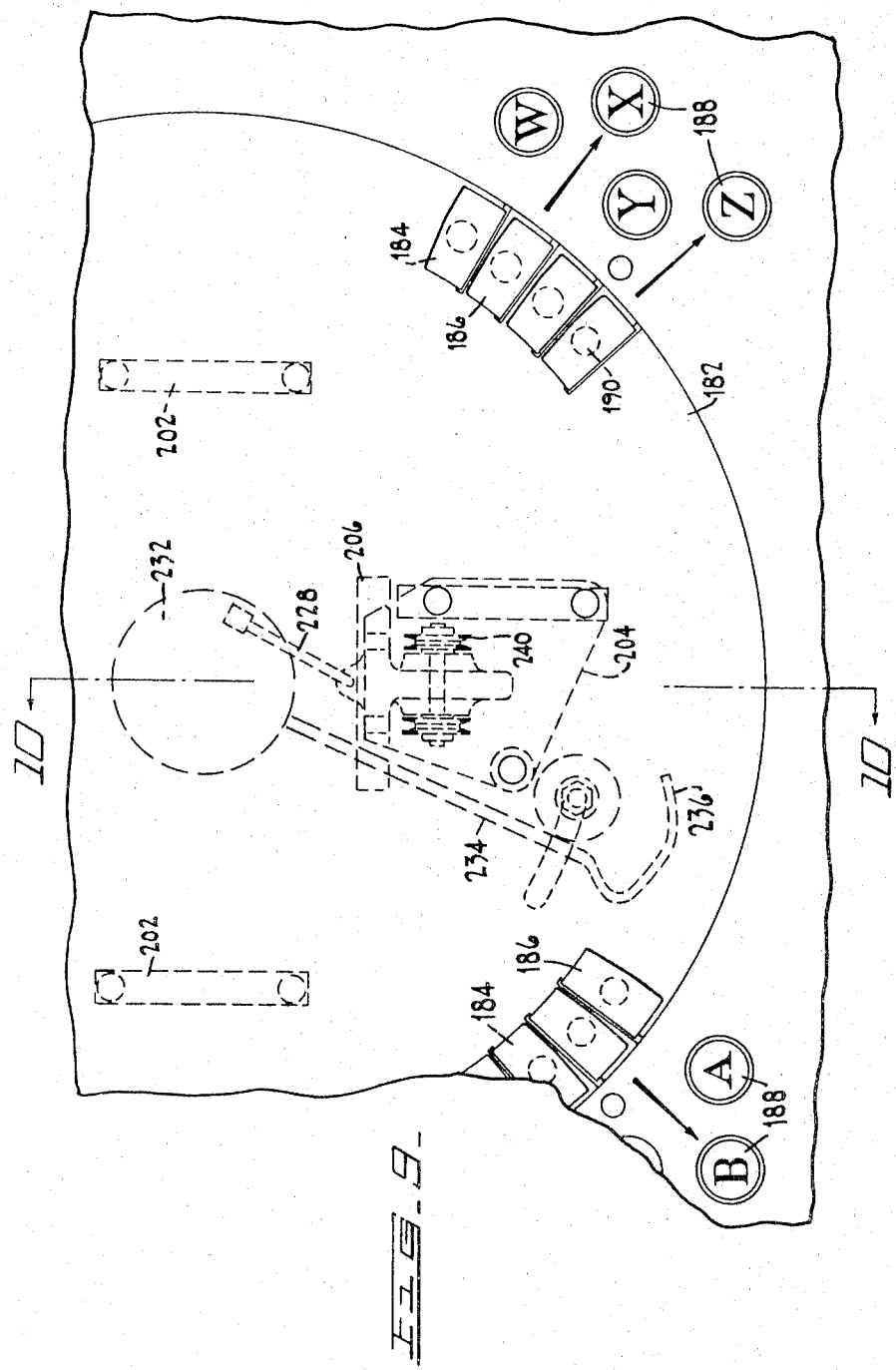

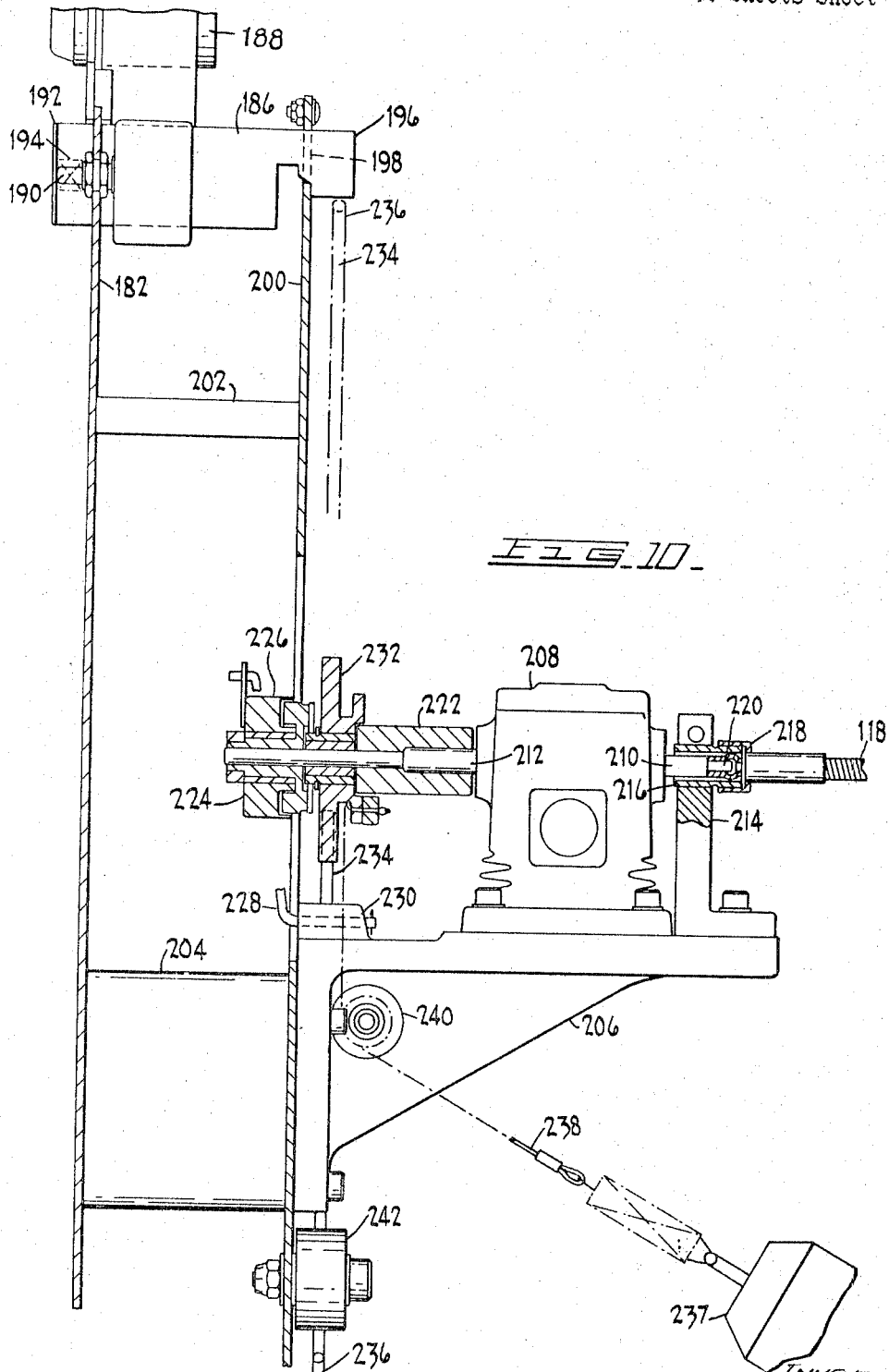

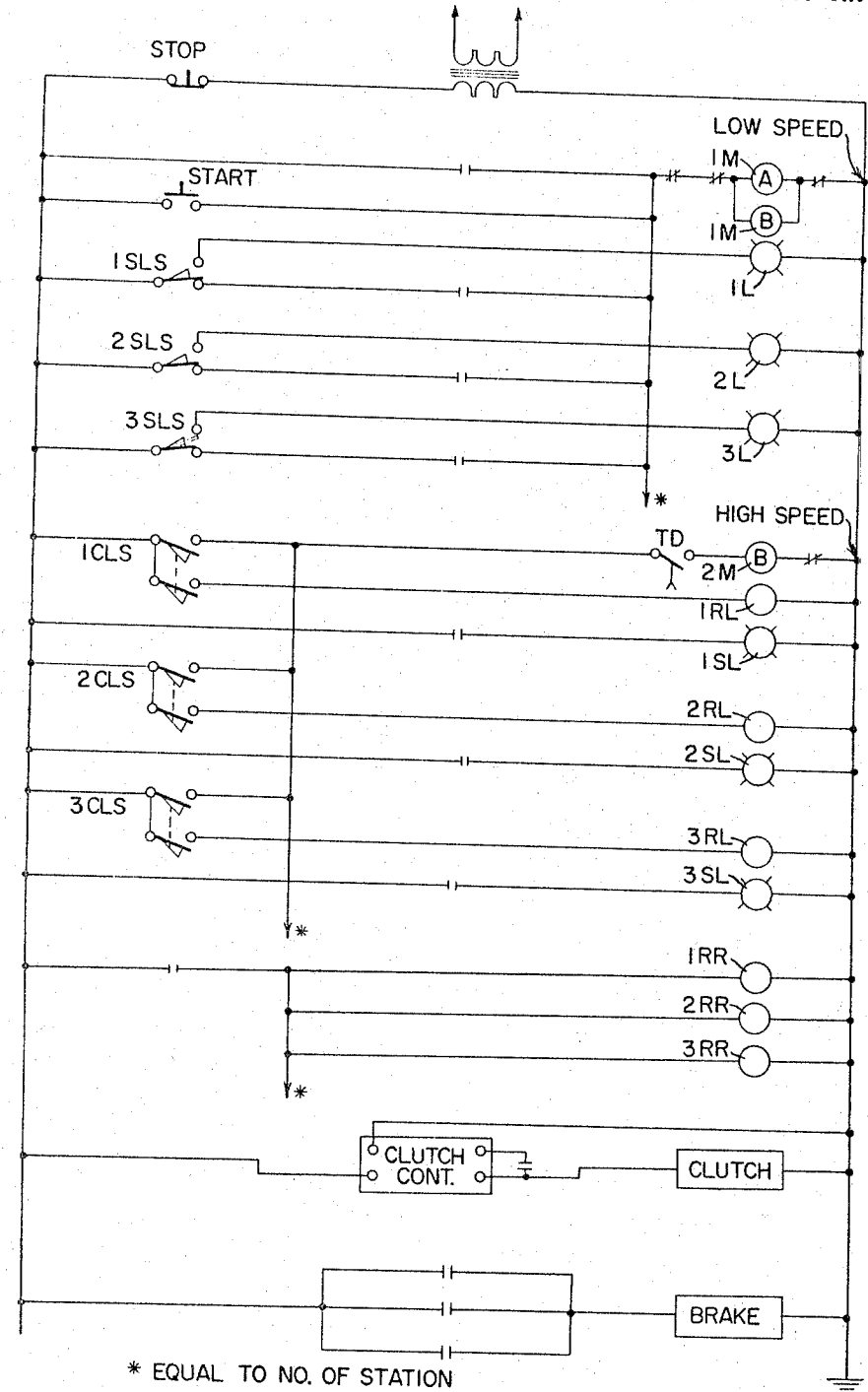

United States Patent Office 3,314,556
Patented Apr. 18, 1967

3,314,556
CONVEYING SYSTEM
Guido Perrella, Montreal, Quebec, and Francois M. Picker, St. Bruno, Quebec, Canada (both % Dynacast Limited, 24 Mount Royal W., Montreal 14, Quebec, Canada)
Filed Apr. 14, 1965, Ser. No. 448,190
Claims priority, application Canada, Mar. 11, 1965, 925,354
15 Claims. (Cl. 214—11)

This invention relates to conveying systems and in particular to a multi-speed conveyor adapted to effect the rapid transfer of work from a dispatching centre to a plurality of work stations and from the latter to a classification section.

Numerous types of conveyors and conveying systems are known, each system being adaptable to its specific form of assembly line construction. In general, however, the majority of known conveyors are designed for station to station operation such as in the jewelry trade where one work station completes or adds on to a work piece in sequential operations. These known systems are not in all cases adaptable to other trades where work pieces vary in size and number of elements and must be classified and matched up with associated elements before being sent to a work station. For example, in the garment manufacturing trades where size, colour and material vary from garment to garment, an operator who sews together the front pieces and sleeves of a garment cannot normally pass the completed work to an adjacent station but must return the work to a dispatcher who matches up the partially completed garment with the back section or other element. The garment is then sent to another work station where more sewing is carried out.

Although the conveying system of the present invention, or at least some of its innovations, are applicable to various trades, the following description, by way of example, refers to the use of the invention in the garment industry. By virtue of the present invention the elapsed time between the beginning of line work and the finished product is substantially reduced. Moreover, the normal confusion and wasted time in the transmission of goods from one work station to another is eliminated while in those sections of a manufacturing plant where the conveyor is used, orderly operation is directed by a dispatcher who classifies and sends out all work thereby reducing improper matching of garment elements, etc.

According to one aspect, therefore, the present invention relates to a conveying system adapted to transmit work or work pieces to and from a plurality of work stations, said system comprising an endless transit line; multi-speed drive means adapted to circulate said transit line from a work classification section along a delivery path in close proximity to said plurality of work stations and subsequently therefrom along a return path to said classification section; a plurality of carriers on said transit line adapted to convey work pieces along said line between the classification section and the work stations; a dispatching centre disposed at the head end of the delivery path of said line, said dispatching centre including primary control means adapted, when actuated, to effect high speed operation of said drive means and transit line for rapid transmission of a work piece from the dispatching centre to a selected work station and to stop said transit line at said selected work station; secondary control means at each work station adapted, when actuated, to restart said transit line at low speed and when deactuated to indicate the work load capacity of said work station to said dispatching centre; and a run-out on the return path of said transit line adapted to remove and deliver work pieces from carriers on said line to said classification section.

The invention is illustrated by way of example in the accompanying drawings wherein:

FIGURE 4 is an end view of the carrier shown in FIGURE 3;

FIGURE 5 is an elevation view of a run-out disposed on the return path of the transit line;

FIGURE 6 is an end elevation of the run-out shown in FIGURE 5 but partly sectioned and showing a carrier in position over the run-out;

FIGURE 7 is a sectioned elevation view of the odometer shown in FIGURE 2;

FIGURE 9 is an elevation view of the control panel of the dispatching centre shown in FIGURES 1 and 2;

FIGURE 10 is a sectional elevation view taken along the line 10—10 of FIGURE 9;

FIGURE 12 is a schematic view of the electrical control circuit.

General description

Figure 1:
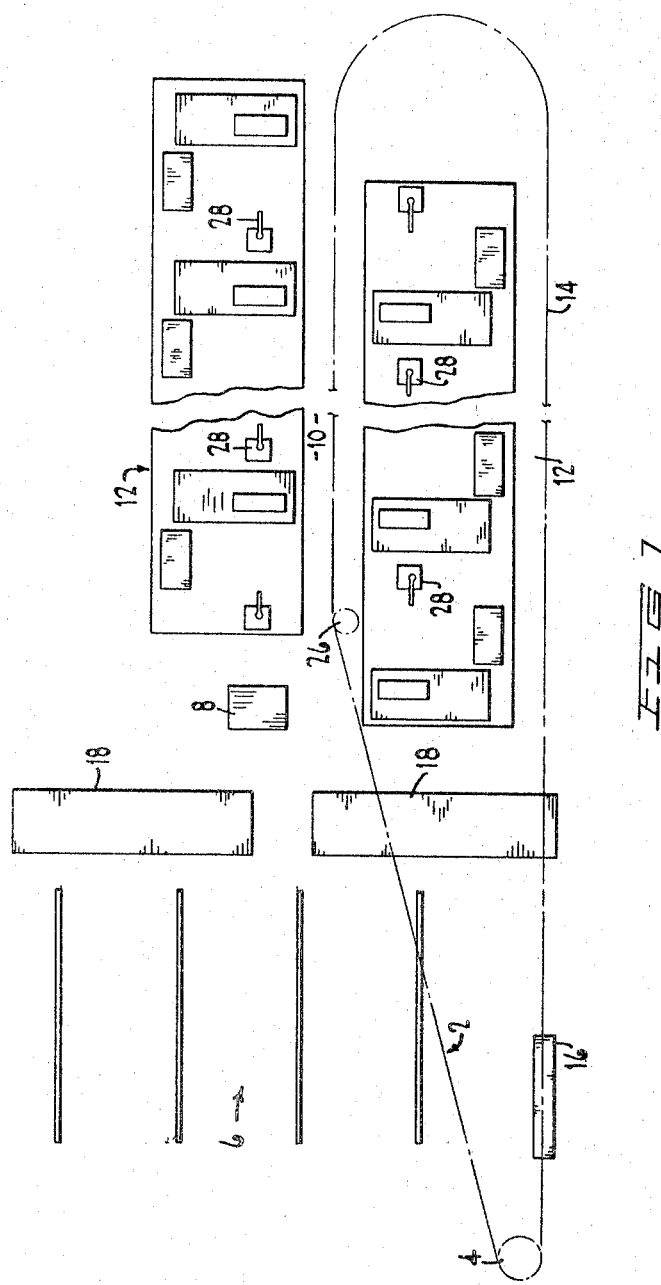
FIGURE 1 is a plan view of a section of a garment plant schematically illustrating the disposition of the elements of the conveyor.

The general layout of the conveyor system is shown in FIGURE 1. An endless or "belt" transit line 2 is suitably supported in any known manner and circulated about a path of travel by drive means 4. Starting from the return loop of the drive means, the transit line 2 runs past a classification section 6, a dispatching centre 8 and along a delivery path 10 medially of a plurality of work stations indicated generally at 12. At the end of the line of work stations, the transit line 2 completes a reverse loop and proceeds along a return path 14, over a take-off mechanism, hereinafter referred to as a run-out 16, to the drive means 4.

It will be appreciated that the conveyor system herein described may be applied with little variation to production or assembly lines of various types. However, as illustrated, the present description refers to the invention as installed in a garment producing plant. Accordingly, it is the practice in such establishments for clothing articles to be sub-assembled into sleeves, collars, fronts or lapels, backs etc., and then paired or matched prior to being assembled or sewn together in the finished product. Therefore, separate work pieces (not shown) are placed in the classification 6 and are subsequently matched up at pairing or matching tables 18 and suspended from the transit line 2 thereafter being sent along the delivery path 10 by an operator at the dispatching centre 8 until the matched work pieces reach a desired work station 12 where the transit line 2 is automatically stopped. When the operator at the work station sews the work pieces together, they are placed back onto the transit line 2 and are thereby carried around the return path 14 until they are removed from the line 2 by the run-out 16. The work pieces then are directed back into the classification section 6 where the sewn pieces may be matched with a further piece and again sent down the delivery path 10 to another work station 12.

Figure 2:
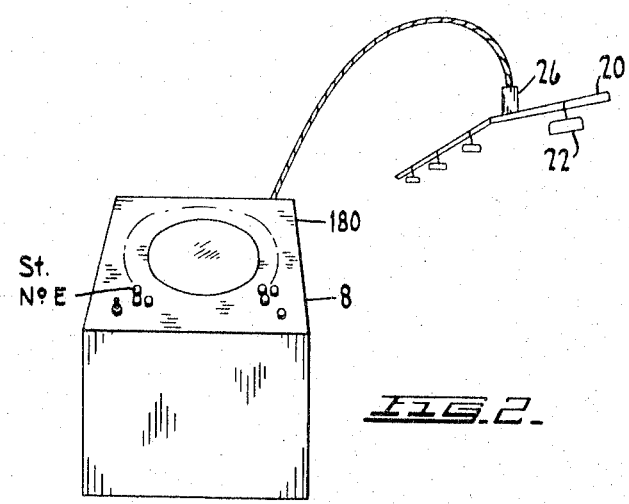
FIGURE 2 is a perspective view illustrating the relationship between the dispatching centre, transit line, and an associated odometer.

As shown in FIGURE 2 the transit line 2 consists of an angle track 20 that supports a plurality of work piece carriers 22. The latter are spaced apart and interconnected by a roller chain 24 that is circulated by the drive means 4. The latter and, therefore, the distance which the chain 24 will travel, is controlled primarily by and responsive to the dispatching centre 8 through the intermediary of a pick-up or odometer connection 26 actuated by the roller chain 24. In addition, however, each work station 12 is provided with a secondary control incorporated in a work reserve stand 28 as indicated generally in FIGURE 1.

In brief, the operation of the conveyor system is as follows:

(1) The drive means 4 and transit line 2 are started at slow speed by actuation of a start button (not shown) on the console panel of the dispatching centre 8.

(2) The dispatching operator selects a work piece, hooks it onto a carrier 22 and as the latter passes the odometer 26, the operator depresses a switch (FIGURE 2) corresponding to a selected work station, for example station E on the line thereof.

(3) The depression of the switch initiates a series of relay actions to (a) illuminate a call lamp (not shown) at work station 10, indicating that a work piece is being delivered; (b) start the drive means 4 and, therefore, the chain 24 are high speed; and (c) actuate a trigger mechanism within the dispatching centre 8 which, when the work piece reaches station E, will release the depressed switch to stop the drive means and chain 24.

(4) The sewing machine operator at station E will remove the work piece from the carrier 22 on the transit line 2 and place it on the provided stand 28 (FIGURE 11) which incorporates one of the secondary controls. This action will restart the drive means 4 and chain 24 at low speed and shut off a further call lamp at the console panel of the dispatching centre 8.

(5) When the machine operator at station E is ready to sew together the work pieces on the stand and removes the reserve work therefrom, the secondary control illuminates the above-mentioned further call lamp at the console panel. This lamp corresponds to work station E and provides the dispatching operator with an indication of the work capacity of that station, showing in effect that no work is in reserve and that further classified work pieces may be delivered to the station.

*Work carrier and transit line*

In many conveyors of the prior art the type of carrier or hook used consisted of a link type chain enclosed in a metal tube. The top of the tube normally is open to allow protrusion of vertically disposed pins connected at their lower ends to the chain links. A hanger was then suspended from the tube and carried therealong by the movement of the pins along the top, open section of the tube.

One of the main drawbacks with the above system is the high frictional resistance between the tube and the chain which usually resulted in a top conveyor speed of approximately 30 to 45 feet per minute. The design of the instant transit line and associated carriers provides, on the other hand, a top speed in the region of 400 feet per minute.

Figure 3:
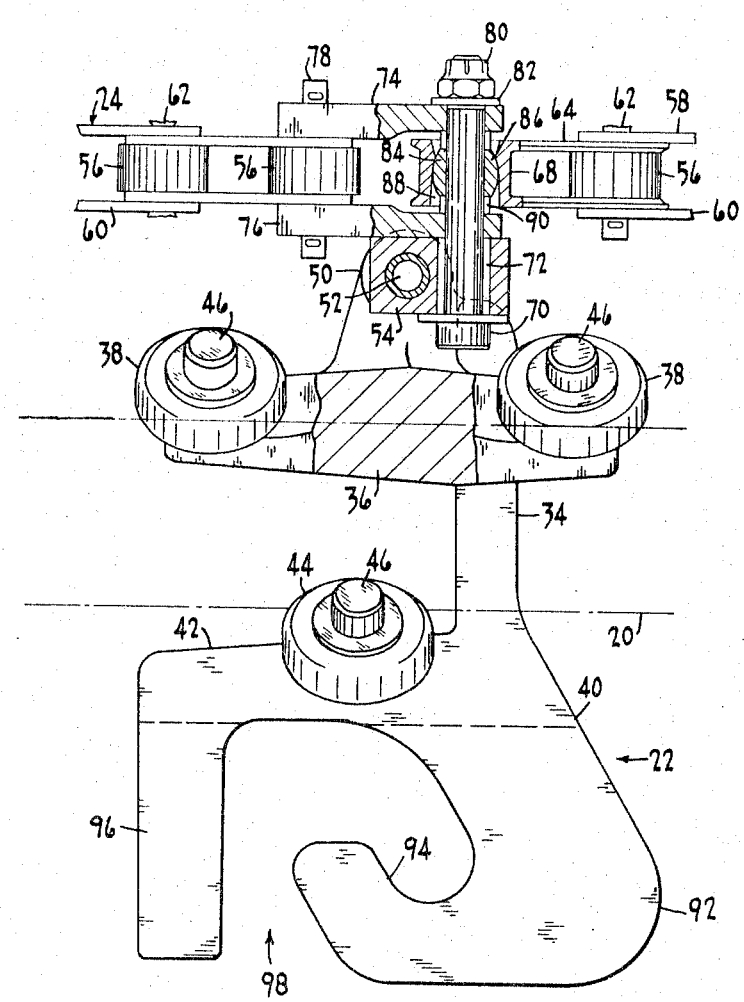
FIGURE 3 is an elevation view, partly sectioned, of a carrier detachably secured to the transit line.

FIGURES 3 and 4 show the connections between and relative positions of the transit line 2 and carrier 22. As previously described, transit line 2 comprises a 90° angle track 20 suspended in a V position by known support means (not shown). Carrier 22 comprises a one-piece casting including a C-shaped arm 34 (as viewed in FIGURE 4) the upper terminal end of which includes a forward and rearward projecting bar 36. Adjacent each end of the bar 36 there is rotatably mounted a pair of upper rollers or wheels 38 adapted to ride on the inner or upper flanges of track 20 as shown in FIGURE 4. The lower end of the carrier arm 34 terminates in a suspension member 40, the upper portion of which is formed as an arm 42 that is spaced from and substantially parallel to the upper projecting bar 36. As shown in FIGURE 3, a further pair of rollers or wheels 44 are mounted for rotation generally centrally of the arm 42 and are adapted to run on the outer flanges of the track 20 adjacent the apex thereof (FIGURE 4). The wheels of both the upper and lower pairs 38 and 44 are preferably formed of a hard plastic such as nylon and are mounted on their respective bars 36 and 42 by shouldered screws or studs 46 and concentric oilite bushings 48. The wheels are, of course, designed for low friction running and could, therefore, consist of metal construction mounted on ball or roller bearings.

Depending upwardly from the upper end of arm 34 of the carrier casting, there is provided a pair of lugs 50 that are align bored to slidably receive a roll pin 52 therethrough. It will be seen from FIGURE 3 that the roll pin 52 pivotally connects the carrier 22 to a bearing block 54.

The chain 24 comprises the usual rollers 56, upper and lower connecting links 58 and 60, respectively, as well as pivot pins 62. Two such units are substituted, however, by other elements whereby the carriers 22 may be connected into the chain 24 as shown in FIGURE 3. One of the normal chain units is replaced by a link 64 having at one end a roller 66 that receives the pivot pin 62 of an adjacent normal chain unit. The other end of link 64 comprises a roller 68 having an interior bore large enough to receive a shouldered bolt 70 that passes upwardly through the link 64 from the bearing block 54 wherein it is pivotally mounted at its lower end by a sleeve or bushing 72. The second normal chain unit is replaced by a pair of upper and lower connecting bars 74 and 76 respectively that are pivotally connected at one end of their ends to a chain roller 56 by means of a pivot pin 78. The other end of the lower bar 76 is connected to the bolt 70 intermediate the bearing block 54 and the lower surface of link 64. The other end of the upper bar 74 is connected adjacent the uppermost end of the bolt 70 and held in place by a castle nut 80 and washer 82.

It will be appreciated that the bolt 70 constitutes a pivot pin in the chain 24, and it is provided on its shank with a ball 84. The large bore in the link 64 is provided with an annular shoulder 86, forming a socket 88 in which the ball 84 rides and the latter is retained in this position by spacer sleeves 90 as shown in FIGURE 3. The above-described elements and their arrangement reduce stress on the longitudinal or running axis of the chain 24, for example when the carrier 22 has a load suspended therefrom and is traversing a change in elevation of the track 20.

FIGURE 4 shows that the lugs 50 on the carrier 22 are spaced apart a substantial distance. The bearing block 54, which is interconnected to the chain 24, thereby may slide along the roll pin 52 from one lug 50 to the other. For example, when a carrier 22 is negotiating a curve or loop in the track 20, the chain 24 will follow the loop in a plurality of short, straight paths and between each change of direction, where the chain 24 runs straight and the track 20 curves, the chain will pull the bearing block 54 over to the lug 50 adjacent the inner side of the curve.

The suspension member 40 is provided with a pair of juxtaposed, downwardly depending legs 92 that are formed in a half-loop to provide a hook 94 from which a work piece may be hung or removed. In addition to the legs 92, a further pair 96 depend downwardly from what may be termed the trailing end of the arm 42 when the direction of travel of the carrier is noted as indicated by the arrow in FIGURE 3. It is to be noted also that the disposition of the legs 92 and 96 form an open-ended channel 98 into which a work piece hanger may be placed. Turning to FIGURE 4, it will be seen that legs 92 and 96 are bifurcated to provide a passage 100 parallel to the running axis of the carrier 22 for a purpose presently to be described.

Work piece run-out

As shown diagrammatically in FIGURE 1, the return path of the transit line 2 is provided with a run-out 16 whereby work pieces that have been sewn can be removed from the traveling carriers 22 and sent to the classification section 6 for further matching or the like.

Referring to FIGURE 5 of the drawings, the run-out 16 comprises a blade 102 that is connected to one flange of the transit line track 20 by hangers 104 and screw plates 106. The upper edge of the blade 102, at its widest part 108, lies closely adjacent the apex of the track 20 but tapers off to a narrow terminal end 110 in the direction that faces the running direction of the carriers 22. Adjacent the other side of the widest part 108, the blade narrows somewhat and drops downwardly away from the running axis of the transit line 2 to terminate in a ferrule 112. The latter is of a diameter to fit within the inside of a tube 114 that drops downwardly in elevation to end at the classification section 6 as shown in FIGURE 1.

FIGURE 6 shows the manner in which work piece hangers 116 are removed from the traveling carriers 22. The vertical axis of the blade 102 lies in vertical alignment with the apex of track 20. As the carriers 22 are drawn along the track 20 by the chain 24, the bifurcated legs 92 and 96 of the carrier pass over the blade which is received in the passage 100 between the legs. With the carrier 22 progressing along the blade 102 the gradual widening thereof or its rising top edge lifts the hanger 116 off the hook 94. The frictional resistance between the hanger 116 and the blade 102 causes the hanger to move back in the channel 98 so that it rests against the inner upper edge of the trailing legs 96. The latter then serve to push the hanger 116 along the remaining length of the blade 102 and as the widest part 108 is past, the legs 96 urge the hanger 116 down the sloping part of the blade towards the ferrule 112 where, as engagement between the legs 96 and hanger 116 ceases, the latter will slide by gravity down the tube 114 to the classification section 6. It will be appreciated that without the presence of the trailing legs 96, the hangers 116, after being removed from the hooks 94, would stop on the blade 102 due to friction.

Odometer

The distance which a work piece is to be carried along the delivery path 10 on the transit line 2, for example the distance between the dispatching centre 8 and work station E, is preselected or set by the dispatching operator on the console panel of the centre 8. As the work piece is being delivered, the distance is measured by the odometer 26 (FIGURES 1 and 2) and the measurement is relayed to the dispatching centre 8 by a rotating flexible shaft 118. When the preselected distance is covered, the centre 8 automatically stops the travel of the chain 24 and the sewing machine operator at station E removes the work piece from the transit line 2.

Figure 8:
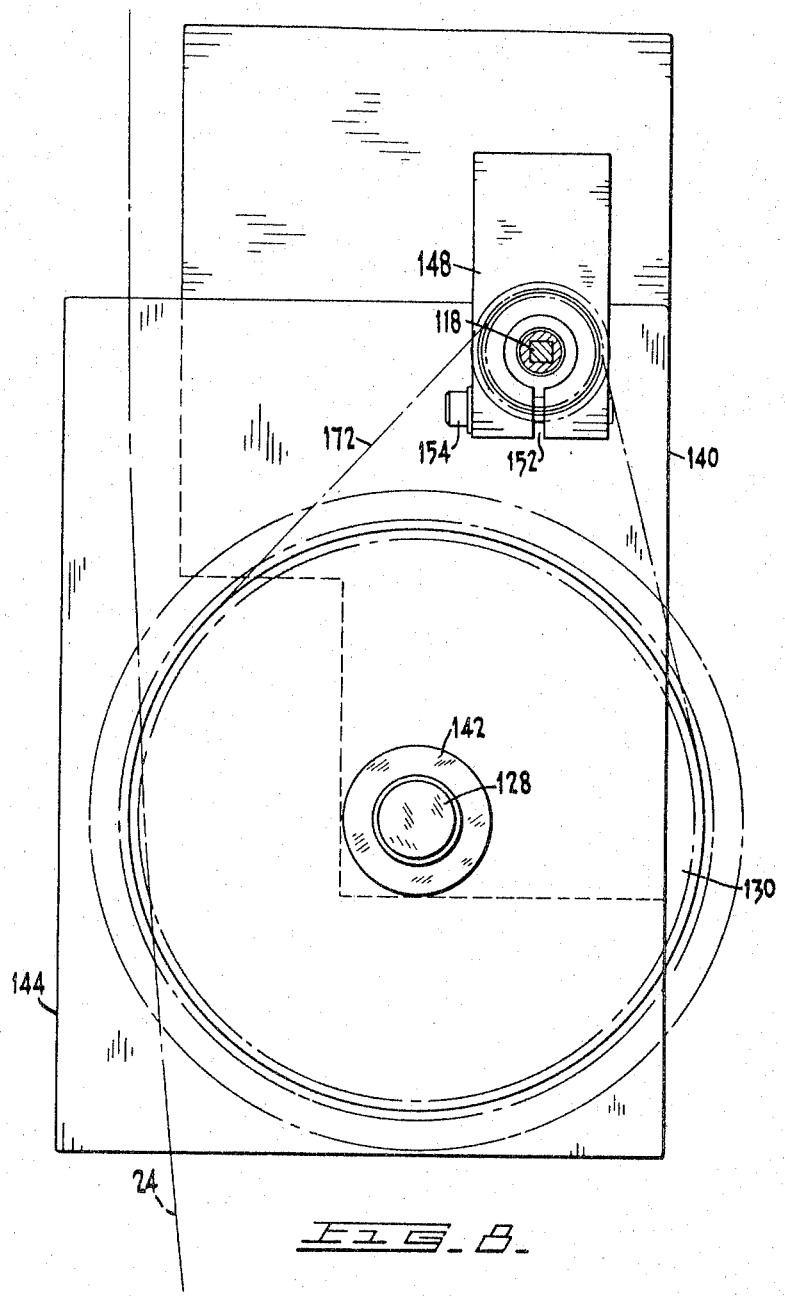
FIGURE 8 is a plan view of the apparatus shown in FIGURE 7.

The odometer mechanism for actuating the flexible shaft 118 is shown in FIGURES 7 and 8 of the drawings. The position of the odometer on the transit line 2 is shown in FIGURE 1 and it will be noted that it is mounted on the line 2 adjacent the dispatching centre 8. The odometer is supported by a base or bracket 120 secured to the track 20 by bolts 122. To the bracket 120 is mounted a sprocket post 124 and a flexible shaft mounting bracket 126. A shouldered cap screw 128 threadably secures the lower end of the post 124 to the bracket 120 while the upper end of the post 124 threadably receives the lower end of an axle bolt 128. A primary sprocket 130 is mounted for rotation on the shank of axle bolt 128 by bearings 132, the lower face of the sprocket 130 being spaced from the top end of post 124 by a thrust bearing 134. The primary sprocket 130 is maintained in proper position on the post 124 by a washer 136 and collar sleeve 138 that space the upper face of sprocket 130 from a cover plate 140 through which the axle bolt 128 passes. The bolt 128 has a shoulder washer 142 which bears against the plate 140 as shown and the latter is bent over adjacent one edge to provide a chain guide 144.

Bracket 126 is secured at its lower end to the bracket 120 by a cap screw 146. The upper end of the bracket 126 forms an angular arm 148 that is drilled to receive a sleeve 150 and the terminal end of the arm 148 is bifurcated at 152 (FIGURE 8) whereby the sleeve 150 may be clamped in place by a cap screw 154.

That portion of the sleeve 150 protruding above the arm 148 threadably receives a casing nut 156 on one end of the flexible shaft 118. The inner terminal end of the latter is suitably connected to the upper end of a shaft 158, for example by a socket collar 160 on the shaft 158. The shank of the latter is provided with an annular flange 162 which cooperates with bushings 164 and a shoulder 166 in the sleeve 150 to keep the shaft 158 from working downwardly in the sleeve.

The shaft 158 is provided on its lower end with a sprocket 168 secured thereto by a set screw 170. The sprocket 168, together with the shaft 158 and flexible shaft 118, are rotated by a chain 172 that is driven by a secondary sprocket 174. The latter is concentrically mounted on and secured to the primary sprocket 130 by cap screws 176 and spacers 178. Obviously, the secondary sprocket 174 transmits to the sprocket 168 and flexible shaft 118 the rotary movement of the primary sprocket 130, the teeth 179 of which are engaged by the transit line chain 24 passing between the sprocket 130 and the chain guide 144.

It will be understood from the above description that the mechanism of the odometer 26 transforms the linear travel of the chain 24 into rotary movement of the flexible shaft 118, the rotary movement being fed to the dispatching centre 8.

Dispatching centre and conveyor operation

The dispatching centre 8 comprises a control console 180, shown partly in section in FIGURE 10, having an outer plate 182 (FIGURE 9) on which are mounted a plurality of circumferentially spaced primary control micro switches 184 and associated control push buttons 186. Each switch 184 corresponds to a specific work station along the transit line 2, the work stations being identified by pilot lamps 188 flanking each push button 186 and bearing the letters A, B, C etc. The console micro switches 184 are designated as 1–CLS, 2–CLS etc., on the electrical diagram of FIGURE 12 while each console pilot lamp 188 is identified thereon as 1L, 2L and so on.

Turning to FIGURE 10, each switch 184 has an actuating plunger 190 that is depressed by the head 192 of the push button 186. The switch 184 is adapted to be retained in the off position by a spring 194 surrounding the plunger 190 and bearing against the underside of the push button head 192. The inner end of each push button 186 terminates in a blade hook 196. When a push button 186 is depressed against the force of spring 194, its hook 196 engages a notch 198 as shown, one being provided for each push button in a circular inner plate 200 mounted in juxtaposition to the outer plate 182 by spacer blocks 202 and 204.

An angle bracket 206 is secured to the rear face of the inner plate 200 and to the spacer block 204 and supports a gear box 208 having an input shaft 210 and an output shaft 212. The input shaft 210 receives the other end of the flexible shaft 118 coming from the odometer 26. A clamping bracket 214 is mounted on the bracket 206 to retain a sleeve 216 that is substantially the same as sleeve 150 shown in FIGURE 7. Accordingly, sleeve 216 threadably receives a casing nut 218 on the end of the flexible shaft 118. The end of the latter is connected to the outer end of the input shaft 210 by a socket collar 220.

Output shaft 212 operates a linear control that de-actuates selectively actuated primary control switches 184. Accordingly, the output shaft 212 is provided, adjacent the gear box 208, with a spacer sleeve 222 and, adjacent its terminal end with an electric clutch 224. The latter includes a bearing mount 226 secured against rotation by a connecting rod 228 fastened as at 230 to the bracket 206. Freely mounted on the output shaft 212 between the sleeve 222 and clutch 224 (and rotatable in response thereto) there is provided a ring plate 232 having a rod 234 secured thereto and extending radially therefrom. As shown by phantom line in FIGURE 9, the free end of the rod 234 is formed as a trigger cam 236.

When the electric clutch 224 is actuated, it picks up the ring plate 232 and rotates the latter, together with the trigger rod 234. When the clutch 224 is deactuated, the ring plate 232 and rod 234 being freely mounted on the output shaft 212, are rotated back to their position shown in full line in FIGURE 10 by a counterweight 237. The counterweight is connected to the plate ring by cables 238 and directed by pulleys 240 and in its inoperative position the trigger rod rests against a rubber stop 242.

When the conveyor is operating at slow speed the output shaft 212 and clutch 224 are rotating with the plate ring 232 and rod 234 in their position shown in FIGURE 9. When the dispatching operator wants to send a work piece to work station E, he presses the corresponding push button, for example 186, to actuate switch 184 whereby the conveyor is operated at high speed. At the same time, the blade hook 196 catches on the corresponding notch 198 in plate 200 as shown in FIGURE 10. Moreover, when the conveyor is actuated to high speed, clutch 224 is actuated thereby rotating the ring plate 232 until its rod 234 reaches the phantom line position of FIGURE 10. Trigger cam 236 engages the blade hook 196, lifting it out of the notch 198; the spring 194 lifts the push button 186 to its off position; the switch 184 is opened to stop the conveyor at station E; and the clutch 224 is deactuated so that the rod 234 is drawn down against the stop 242 by the counterweight 236.

Figure 11:
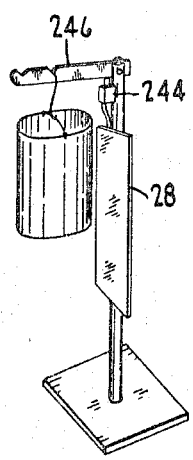
FIGURE 11 is a perspective view of a work piece stand at a work station.

FIGURE 11 shows a secondary control comprising a reserve stand 28 having a switch 244, one provided at each work station. Switches 244 are indicated on the electrical diagram of FIGURE 12 by 1-SLS, 2-SLS, etc. Switch 244 is actuated by a hanger bar 246 on the stand 28. When the sewing machine operator removes reserve work from the hanger bar 246 the switch (2-SLS) closes to the phantom position shown in FIGURE 12 so that the stations' console lamps, for example 2L, is illiminated. After a work piece has been delivered to the station and hung on the bar 246, switch 2-SLS is opened turning off the lamp 2L on the console whereby the conveyor is restarted at slow speed and the call lamp 2L is turned off.

Operational sequence

The operator of the dispatching centre 8 starts the conveyor at slow speed by depressing the master start button, FIGURE 12. If all work stations are operating and each station has a reserve of work on the stands 28 (in addition to the work at the sewing machine) the console station lamps 1L, 2L etc. will remain turned off. As each work piece is completed, the work station operator will place it on a carrier 22 on the slow moving transit line 2. Eventually that work piece will reach the run-out where it will be removed from the transit line 2 and sent to the classification section 8. During the slow speed operation of the conveyor, the electric clutch 224 is disengaged and is rotating by means of the output shaft 212, gear box 208 and flexible shaft 118.

When an operator of a work station turns to the reserve work and removes the latter from the stand 28, the associated switch 2-SLS is thrown thereby illuminating a pilot lamp 2L (188 in FIGURE 10). This indicates to the dispatching operator that there is no work reserve at that station.

The dispatching operator therefor selects a work piece, or a blundle thereof, from the classification 6 and hangs it on a carrier 22 on the slow moving conveyor. As the carrier 22 reaches the region of the odometer 26, the dispatching operator presses the push button 186 that corresponds to the empty work station whereby the hook 196 of the push button 186 engages its notch 198 in the inner plate 200 of the centre 8.

As previously described, the depression of the push button throws the console micro switch 2-CLS (184 in FIGURE 1). This institutes a series of relay actions to simultaneously effect the following operations:

(a) A pilot lamp 2-SL on the work station tells the machine operator that a work piece is being delivered;
(b) Switch the drive means 4 and chain 24 into high speed operation; and
(c) Energize the electric clutch 224 to engage ring plate 232.

As the carrier 22 and its work piece proceed at high speed to the designated work station, the clutch 224, by means of the rotary action of the flexible shaft 118, rotates the ring plate 232 and its associated arm 234. It will be appreciated that the circumferential distance between the arm stop 242 (FIGURE 9) and the depressed push button 186 corresponds to the linear distance, on the transit line 2, between the odometer 26 and the designated work station.

Therefore, as the arm 234 reaches the push button 186, the trigger cam 236 engages the hook 196, flipping it out of the notch 198 in the plate 200. Thereafter:

(a) Spring 194 throws the switch 184 (2-CLS) off to the FIGURE 12 position;
(b) Chain 24 on the transit line 2 is stopped at the designated work station;
(c) Work station pilot lamp 2-SL is turned off;
(d) Clutch 224 is de-energized to release the plate 232 and arm 234 which is rotated back to the stop 242 by the counterweight 237; and
(e) The machine operator at the work station removes the work piece from the carrier 22 and hangs it one the stand 246 thereby throwing switch 2-SLS which turns off the console mounted pilot lamp 2L and restarts the conveyor at slow speed.

It will be appreciated that the described installation of the present invention is by way of example only and that, with minor modifications within its scope, is applicable to various conveying operations.

We claim:

1. A conveying system adapted to transmit work to and from a plurality of work stations, said system comprising an endless transit line; multi-speed drive means adapted to circulate elements of said transit line from a work piece classification section along a delivery path defined by said plurality of work stations and subsequently therefrom along a return path to said classification section; a plurality of carriers on said transit line adapted to convey work pieces along said line between said classification section and said work stations; a dispatching centre at the head end of said delivery path including primary control means adapted, when actuated, to effect high speed operation of said drive means and transit line elements for rapid transmission of a work piece from said dispatching centre to a selected work station and to stop said transit line elements at said selected work station; secondary control means at each work station adapted, when actuated, to restart said drive means and said transit line elements at low speed and, when deactuated, to indicate to said dispatching centre the work load capacity of said work station; a run-out on said transit line adapted to remove and deliver work pieces from said carriers on said return path to said classification section; and means on said transit line for relaying to said dispatching centre the linear distance travelled by a carrier along said delivery path.

2. A conveyor system adapted to transmit work to and from a plurality of work stations, said system comprising a transit line including a conveying chain; multi-speed drive means adapted to circulate the chain of said transit line from a work piece classification section along a delivery path defined by said plurality of work stations and subsequently therefrom along a return path to said classification section; a plurality of carriers on the chain of said transit line adapted to convey work pieces along said line between said classification section and said work stations; a dispatching centre disposed adjacent the head end of said delivery path and including primary control means adapted, when actuated, to effect high speed operation of said drive means and transit line chain for rapid transmission of a work piece from said dispatching centre to a selected work station and to stop said transit line chain at said selected work station whereby said work piece can be removed from said carrier; secondary control means at each work station adapted, when actuated, to restart said drive means and said transit line chain at low speed and, when deactuated, to indicate to said dispatching centre the work load capacity of said work station; a run-out on said transit line adapted to remove work pieces from said carriers on the return path for delivery to said classification section; and means on said transit line, operable by said chain, for measuring the linear distance travelled by a carrier along said delivery path and relaying said distance to said dispatching centre.

3. A conveying system adapted to transmit work to and from a plurality of work stations, said system comprising an endless transit line having a stationary track and a conveying chain; multi-speed drive means adapted to circulate said conveyor chain of said transit line from a work piece classification section along a delivery path defined by said plurality of work stations and subsequently therefrom along a return path to said classification section; a plurality of carriers mounted for transmission on said transit line track and being adapted to convey work pieces along said line between said classification section and said work stations, said carriers being spaced along said line by, and connected to, said conveying chain to be circulated thereby about said transit line; a dispatching centre on said delivery path adjacent the head end thereof and including primary control means adapted, when actuated, to effect high speed operation of said drive means and transit line elements for rapid transmission of a work piece and a carrier from said dispatching centre to a selected work station and to stop said transit line elements at said selected work station whereby said work piece may be removed from said carrier; an odometer mounted on said transit line and interconnected on said dispatching centre, said odometer being operable by said conveying chain for measuring linear travel of said chain along said delivery path and being adapted to relay said distance to said dispatching centre; a secondary control means at each work station adapted, when actuated to restart said drive means and said transit line elements at low speed and, when deactuated, to indicate to said dispatching centre the work load capacity of said work station; and a run-out associated with said transit track adapted to cooperate with said carriers to remove work pieces therefrom on said return path and to effect delivery of said work pieces to said classification section.

4. A conveyor system for the rapid transmission of work to and from a plurality of work stations, said system comprising:
  (a) an endless transit line track having a delivery path and a return path;
  (b) a transmission chain associated with said track for circulation about said paths;
  (c) a plurality of work piece carriers mounted for movement on said track, being spaced by and connected to said chain for circulation around said track;
  (d) drive means for circulating said transmission chain and said carriers;
  (e) a run-out mounted on the return path of said track adapted to cooperate with said carriers to remove work pieces suspended therefrom;
  (f) a dispatching centre adjacent said delivery path including (1) primary control means associated with each of said work stations adapted, when selectively actuated, to effect high speed operation of said drive means and transmission chain along said delivery path to a selected one of said work station, and (2) a linear control adapted to deactuate a selected primary control when said carrier and chain arrive at said selected work station whereby said drive means and chain are stopped;
  (g) a secondary control at each work station adapted, when actuated, to restart said drive means and transmission chain at low speed and when deactuated, to provide indication of work capacity, at said station, and said dispatching centre;
  (h) an odometer mounted on said transit line track and being operated by said transmission chain, said odometer being adapted to measure linear distance travelled by said transmission chain along said delivery path; and
  (i) means interconnecting said odometer and said dispatching centre for operating the linear control thereof.

5. A conveying system according to claim 4 wherein said work piece carrier includes a first pair of depending legs forming a suspension hook and a second pair of depending legs defining a chanel to said hook; said first and second pairs of legs being bifurcated to provide a passageway therebetween for cooperation with said run-out.

6. A conveying system according to claim 5 wherein said run-out comprises a blade secured to said transit track adapted to be received in the passageway between the legs of said carriers, the width of said blade extending upwardly beyond the hook of said carrier whereby a work piece hanger will be removed therefrom into said hook channel; the second pair of said carrier legs being adapted to direct said work piece hanger off of said blade toward a classification section.

7. A conveying system according to claim 4 wherein said interconnecting means between the linear control of said dispatching centre and said odometer comprises a flexible shaft, and wherein said odometer includes a primary sprocket mounted adjacent said transit track for rotation by said transmission chain; a secondary sprocket concentrically mounted on and secured to said primary sprocket; a sprocket connected to one end of said flexible shaft; and a chain connecting said secondary and flexible shaft sprockets, whereby rotation of said primary sprocket by the transmission chain transforms linear travel thereof into rotary action of said flexible shaft.

8. A conveying system according to claim 7 wherein the linear control of said dispatching centre comprises clutch means operatively connected to one end of said flexible shaft; and a trigger mechanism rotatable by said clutch means and adapted, when rotated, to engage and deactuate a selected primary control whereby said transmission chain and a selected carrier will be stopped at the work station associated with said selected primary control.

9. A conveyor system according to claim 4 wherein said secondary control comprises switch means for restarting said drive means and a work piece stand having an arm for actuating said switch when a work piece is suspended therefrom.

10. In a conveyor system of the type including a transit line and driven transmission means on said transit line for transporting work to and from a plurality of work stations adjacent said line, a dispatching control mechanism interconnected with said driven transmission means for operational control of said system, said control mechanism comprising (a) an odometer associated with said transit line operable by said transmission means adapted to measure linear travel of said transmission means;
(b) a dispatching console including primary control means associated with each work station adapted, when selectively actuated, to effect high speed operation of said driven transmission means on said transit line to a selected one of said work stations;
(c) a linear control adapted to deactuate a selectively actuated primary control when said transmission means reaches said selected work station whereby the transmission means is stopped;
(d) a flexible shaft connected at one end to said odometer for rotation thereby and being connected at its other end to said console for operation of said linear control; and
(e) switch means at each work station adapted to restart said transmission means at low speed.

11. A control mechanism according to claim 10 wherein said primary control means comprises a plurality of console mounted switches each corresponding to a work station and controlling high speed operation of said transmission means; an actuator for each said switch including a hook portion for retaining a switch in actuated position and being releasable by said linear control.

12. A control mechanism according to claim 11 wherein said linear control comprises a gear box having an input shaft connected to said flexible shaft; an output shaft; an electric clutch operatively mounted on said output shaft; a ring plate and arm freely mounted on said output shaft and rotatable by said clutch; the free end of said ring plate and arm having a trigger cam thereon whereby, when said ring plate and arm are rotated by said clutch, the trigger cam will release said primary switch actuator to stop said transmission means.

13. In a conveyor system having a transit track and driven transmission means for circulation about said track, a work piece carrier adapted for connection to said transmission means for movement along said track, said carrier comprising an upper portion having a bar projecting forwardly and rearwardly therefrom in alignment with the running axis of said carrier; a pair of rollers rotatably mounted adjacent each projecting end of said bar adapted to provide low frictional engagement with the upper side of said transit track; a lower portion having a projecting arm spaced from and substantially parallel with the projecting bar of said upper portion; a pair of rollers rotatably mounted on said lower arm for low frictional engagement with the underside of said transit track; an arm connecting said upper and lower portions together; means on the upper portion of said carrier for connecting the latter to said driven transmission means; and said lower portion including suspension means for carrying a work piece along said track.

14. A carrier according to claim 13 wherein the pair of rollers on said lower portion are disposed substantially centrally of the pairs of rollers on said upper portion.

15. A carrier according to claim 13 wherein said suspension means comprises a first pair of legs depending downwardly from one end of said projecting arm and forming a hook; and a second pair of legs depending downwardly from the other end of said projecting arm defining a channel to said hook.

References Cited by the Examiner
UNITED STATES PATENTS

| | | | |
|---|---|---|---|
| 1,778,484 | 10/1930 | Da Costa | 214—60 |
| 2,017,148 | 10/1935 | Frost et al. | 214—11 |
| 2,216,685 | 10/1940 | Caesar | 214—11 |
| 3,021,967 | 2/1962 | Patzold et al. | 214—11 |

EVON C. BLUNK, *Primary Examiner.*

A. C. HODGSON, *Assistant Examiner.*